US006363601B1

(12) United States Patent
Schneid

(10) Patent No.: US 6,363,601 B1
(45) Date of Patent: Apr. 2, 2002

(54) PROCESS FOR THE PRODUCTION OF FITTINGS AND OF A MACHINE FOR THE MECHANICAL PROCESSING OF SUSPENDED FIBROUS MATERIAL AS WELL AS FITTINGS AND A MACHINE PRODUCED ACCORDING TO THE PROCESS

(75) Inventor: Josef Schneid, Vogt (DE)

(73) Assignee: Voith Sulzer Papiertechnik Patent GmbH, Ravensburg (DE)

( * ) Notice: Subject to any disclaimer, the term of this patent is extended or adjusted under 35 U.S.C. 154(b) by 0 days.

(21) Appl. No.: 09/207,766

(22) Filed: Dec. 9, 1998

(30) Foreign Application Priority Data

Dec. 10, 1997 (DE) ........................................ 197 54 807

(51) Int. Cl.[7] ............................ B23P 11/00; B02C 1/10
(52) U.S. Cl. .......................... 29/436; 241/296; 241/298
(58) Field of Search ................................ 241/296, 298, 241/DIG. 30; 156/299, 300; 29/436, 434

(56) References Cited

U.S. PATENT DOCUMENTS

| | | | | | |
|---|---|---|---|---|---|
| 1,013,777 | A | * | 1/1912 | Jackson | 241/296 |
| 1,710,459 | A | * | 5/1929 | Romero | 241/296 |
| 3,128,055 | A | * | 4/1964 | Michel | 241/296 |
| 3,139,709 | A | * | 7/1964 | Walters | 241/296 |
| 3,462,089 | A | * | 8/1969 | Whitlow | 241/296 |
| 4,240,530 | A | * | 12/1980 | Tillenburg | 188/250 |
| 5,779,168 | A | * | 7/1998 | Meltzer | 241/298 |

FOREIGN PATENT DOCUMENTS

| | | |
|---|---|---|
| DE | 19603548 | 5/1997 |

* cited by examiner

*Primary Examiner*—S. Thomas Hughes
*Assistant Examiner*—Marc Jimenez

(74) *Attorney, Agent, or Firm*—Greenblum & Bernstein, P.L.C.

(57) ABSTRACT

Fittings and machine and process for production of the fittings and machine for a mechanical processing of suspended fibrous material that include at least one base and at least one processing element adapted to be exposed to flow of a fibrous suspension during operation. The process for producing the fittings may include separately producing the at least one base and the at least one processing element, placing an elastic bonding material between contact surfaces of the at least one base and the at least one processing element, and elastically bonding the at least one base and the at least one processing element without melting the processing elements. The process for producing the machine may include forming at least one of the at least two fittings by separately producing the at least one base and the at least one processing element, placing an elastic bonding material between contact surfaces of the at least one base and the at least one processing element, and elastically bonding the at least one base and the at least one processing element without melting the processing elements, mounted for relative movement to each other, and mounting the at least two fittings for movement relative to each other. The fittings may include a base adapted for attachment to a processing machine, at least one processing element adapted to be exposed to a stream of a fibrous material suspension during operation of the fitting, and an elastic layer located between the base and at least one processing element to couple the at least one processing element to the base. The machine may include at least two fittings mounted for relative movement to each other. At least one of the at least two fittings may include at least one base that is at least one of rotatably and non-rotatably mounted, at least one processing element adapted to be exposed to the suspended fibrous material, and an elastic layer located between the base and at least one processing element to couple the at least one processing element to the base.

32 Claims, 3 Drawing Sheets

Fig.1
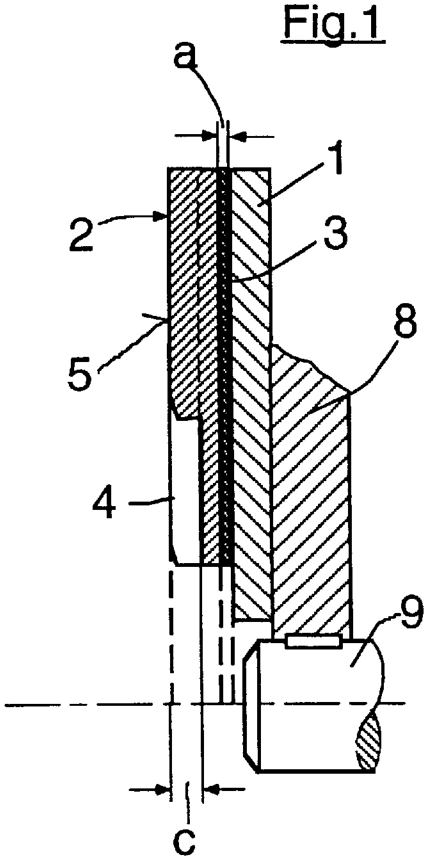
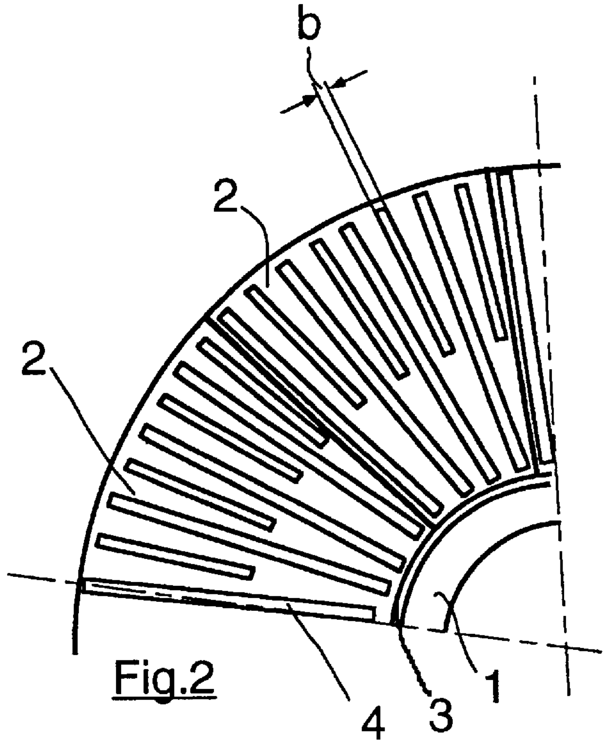
Fig.2
Fig.3
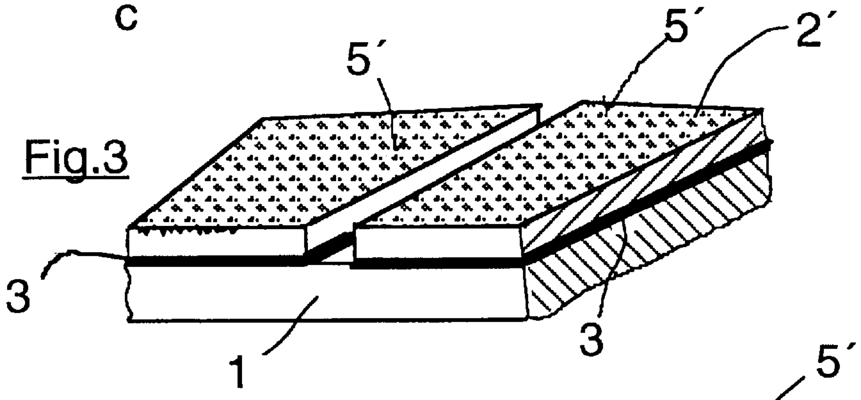
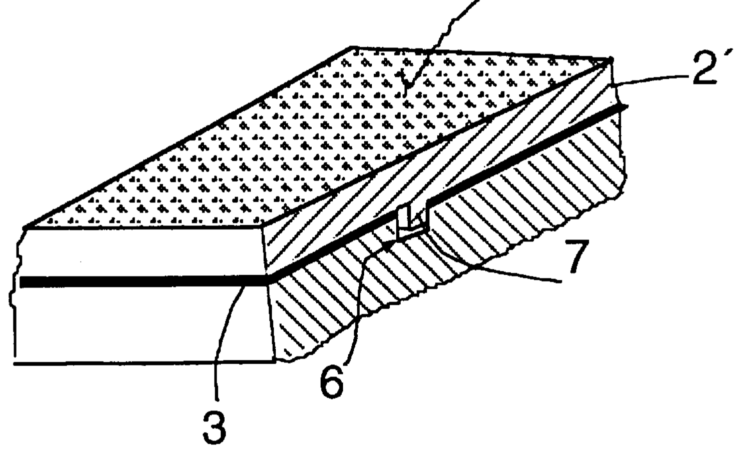
Fig.4

Fig.5
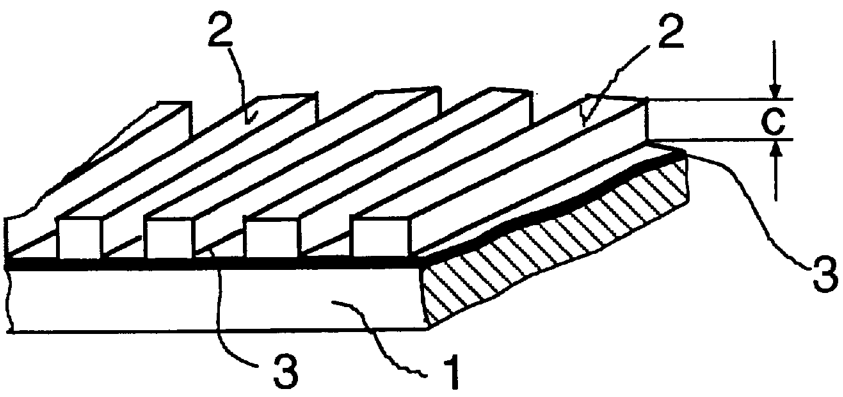
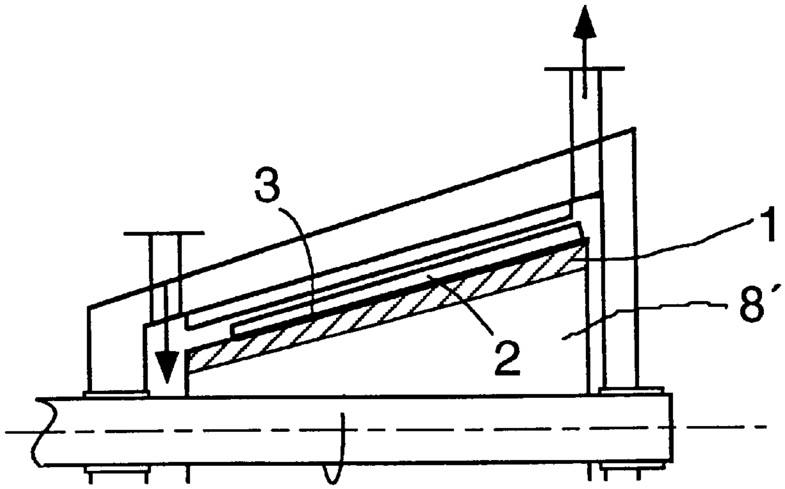
Fig. 6
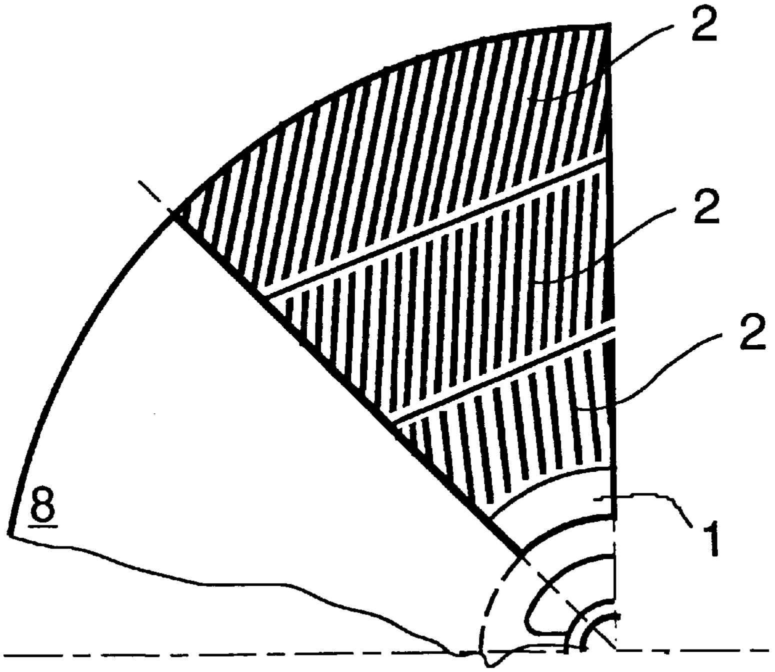
Fig.7

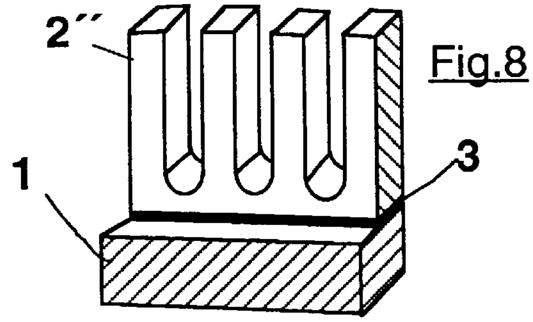
Fig.8
Fig.9
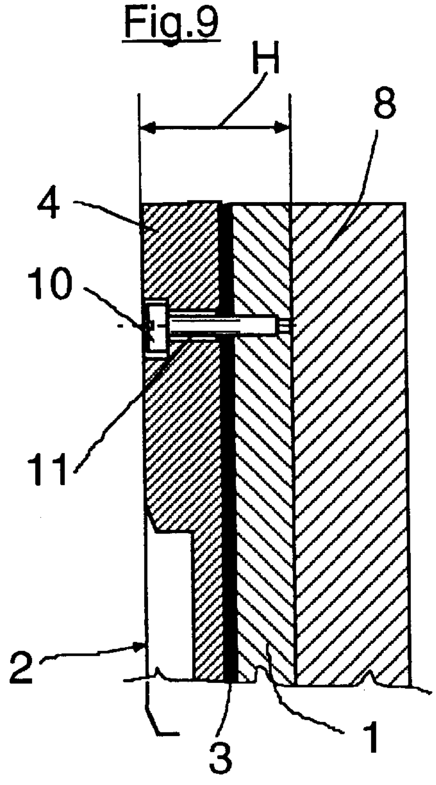
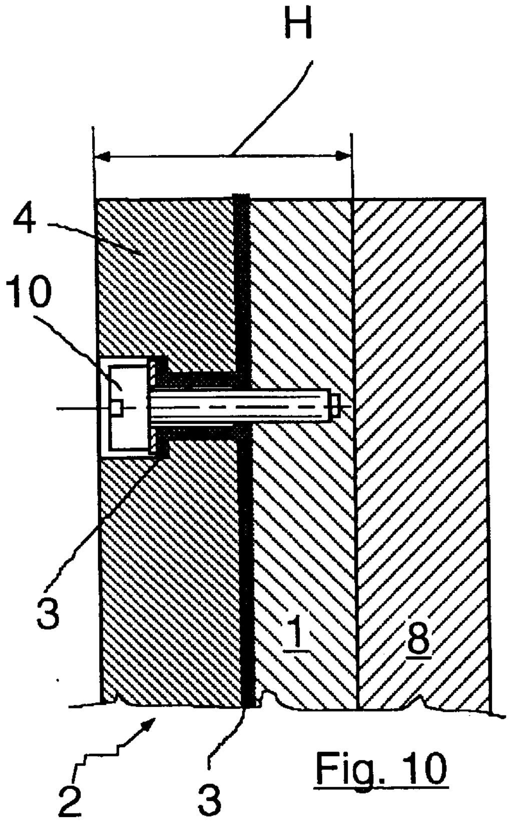
Fig. 10
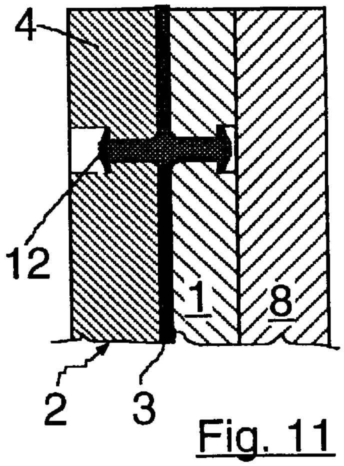
Fig. 11
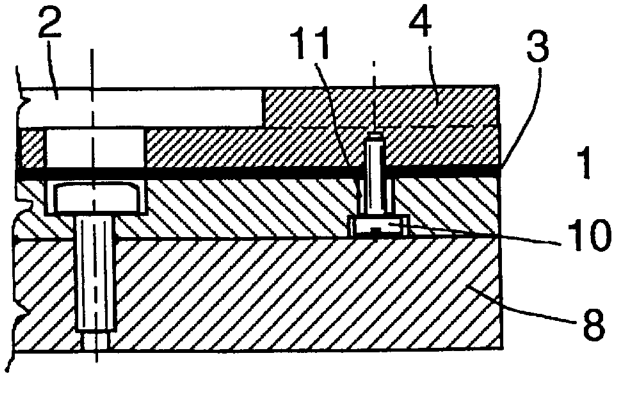
Fig.12

PROCESS FOR THE PRODUCTION OF FITTINGS AND OF A MACHINE FOR THE MECHANICAL PROCESSING OF SUSPENDED FIBROUS MATERIAL AS WELL AS FITTINGS AND A MACHINE PRODUCED ACCORDING TO THE PROCESS

CROSS-REFERENCE TO RELATED APPLICATIONS

The present application claims priority under 35 U.S.C. §119 of German Patent Application No. 197 54 807.5, filed on Dec. 10, 1997, the disclosure of which is expressly incorporated by reference herein in its entirety.

BACKGROUND OF THE INVENTION

1. Field of the Invention

The present invention is related to a process for production of fittings for mechanical processing of suspended fibrous material. The fittings include at least one base and at least one processing element adapted to be exposed to flow of the fiber suspension during operation of the fitting.

2. Discussion of the Background Information

Fittings produced in the manner generally discussed above are used for mechanical processing of suspended fibrous material, e.g., beating of paper pulp, dispersion of contaminants and fibers as well as deflaking, i.e., breaking down of fiber agglomerations. Fittings are, e.g., built into beaters or "refiners." The suspension in refiners has a solid content of approximately 2–8% wt. Similar pulp densities are also established in deflakers. Impellers used in pulpers may also have fittings similar in general to those discussed above, in which wet crushing of an introduced fibrous material is performed. Machines for higher pulp densities, e.g., high-consistency mills, dispersers, or kneaders, are utilized for mechanical processing the entire fibrous material, i.e., to disperse foreign matter contained therein. Such machines have at least one rotor and at least one stator with either disk-shaped or cone-shaped surfaces onto which the fittings are applied so that gaps may be formed between them. Many fittings have webs and grooves on their work surfaces, sometimes referred to as "knife fittings." Other fittings have the shape of toothed rings. Moreover, it is known that, in addition to the shape of the webs, grooves, and teeth, the material from which these fittings are made also affects the processing of the fibrous material.

The fittings are exposed to wear and, consequently, must be replaced at specific intervals. However, during their service life, wear may cause the processing action to change because the shape and surface of the fittings have a great influence on the processing effect.

Thus, it is understandable that a significant expense, which is reflected in the specific design of shape and choice of the materials, is incurred in developing fittings. It has been demonstrated that materials which are particularly suited for use as processing elements have properties which may be very problematic for use as a base of the fitting. This is particularly true of materials which are very hard and brittle, e.g., ceramics, and, consequently, which do not have the necessary ductility for the base. Furthermore, such materials are relatively expensive, time-consuming to produce, and can be used only at great expense compared to standard metal materials.

The base of a processing tool provides a connection of the processing element to the remaining components, e.g., the components of a beater. Due to the high forces which occur in such beaters, particularly high strength requirements are required for the base. It must also be possible to reliably attach the base to the beater, in particular, via high-stress screws. Because of these requirements, a particularly strong and ductile material is essential for the producing the base.

A process for production of fittings is known from DE 196 03 548 A1, in which the fittings are assembled from separately manufactured parts. However, this publication only very generally discusses a bonding means that is applied between the base and processing element, but specifically identifies the very expensive high-temperature vacuum welding process or gluing processes. However, these processes cannot always be used, i.e., they are too expensive for many applications, and, when used in the more inexpensive processes, yield strengths which are not always adequate.

SUMMARY OF THE INVENTION

The present invention provides a process for the production of fittings in which particularly well-suited brittle materials may be used as processing elements and may be bonded relatively simply to the base.

In this regard, the process of the present invention includes producing an elastic bond between the processing elements and the base.

Thus, the present invention, as with the known production processes discussed above, may utilize different materials for the processing elements and for the base. As discussed above, this may be of significant advantage in that the selection of material for the processing element is based on a desired processing technology, whereas selection of the material for the base is primarily based on its strength and is optimized in terms of cost.

According to the features of the present invention, the connection between bases and processing elements is elastic, sufficiently precise, and, overall, cost-effective. Thus, because the parts connected together are not intended to move relative to each other, a damping action due to the elastic layer provides favorable performance. For example, the elastic layer may attenuate stress peaks and also reduce the often troublesome noise generation of these type machines. Vulcanization is a process already widespread in production engineering which has proven itself even under demanding conditions in, e.g., the chassis of motor vehicles, where it is used for the connection of steel parts which move against each other. Surprisingly, with the coupling of ceramic and steel, vulcanization provides the necessary properties for the applications to be performed by the fittings. The same is true for bonds made with elastic layers such as, e.g., silicone or elastic plastics. Thus, a homogeneous layer that adheres on both sides and cures such that it remains largely elastic may be formed, or a finished layer of elastic material may be glued on both sides.

The formation of an intermediate layer having a thickness of, e.g., between approximately 0.5–2 mm, may also compensate for any differing expansion characteristics of the joined parts. As is known, the coefficients of thermal expansion of ceramic and steel differ significantly, which causes problems with rigid connections.

It may also be beneficial that the temperatures during vulcanization or gluing may be far below the melting points of the parts joined.

Moreover, the present invention facilitates re-machining worn fittings by removing the remains of the old processing element and replacing it with a new one.

The present invention is directed to a process for production of fittings for a mechanical processing of suspended fibrous material that include at least one base and at least one processing element adapted to be exposed to flow of a fibrous suspension during operation. The process includes separately producing the at least one base and the at least one processing element, placing an elastic bonding material between contact surfaces of the at least one base and the at least one processing element, and elastically bonding the at least one base and the at least one processing element without melting the processing elements.

In accordance with another feature of the present invention, after the elastic bonding, an elastic layer having a thickness of at least approximately 0.5 mm may be formed between the at least one base and the at least one processing element. Further, after the elastic bonding, the elastic layer formed between the at least one base and the at least one processing element has a thickness of at least approximately 1.0 mm.

In accordance with another feature of the present invention, the elastic bonding may include vulcanizing the elastic bonding material. The elastic bonding material may be composed of a polymer. Further, the vulcanizing may include setting a temperature at the contact surfaces between approximately 100° C. to 150° C. The vulcanizing may include maintaining an absolute pressure of under at least approximately 3 bar. The vulcanizing may include providing an air/steam atmosphere. The polymer may be composed of a synthetic rubber.

In accordance with still another feature of the present invention, the placing of the elastic bonding material may include forming the polymer into a sheet, attaching the polymer sheet to the at least one base, and placing the at least one processing element on the polymer sheet.

In accordance with a further feature of the present invention, the elastic bonding material may form an elastic layer after the elastic bonding, and the process further includes gluing the elastic layer to the at least one base and to the at least one processing element. Further, the elastic bonding material may be composed primarily of silicone. The elastic bonding material may be composed of a plastic sheet that is coated on both sides with an adhesive.

In accordance with still another feature of the present invention, the at least one processing element may be composed at least partially of ceramic.

In accordance with a still further feature of the present invention, the at least one processing element may be composed of a ceramic composite material.

In accordance with another feature of the present invention, the at least one processing element may include ridges located on a side adapted to be positioned toward the pulp suspension. The ridges may extend above a base of a groove by between approximately 2 and 20 mm.

In accordance with still another feature of the present invention, the at least one processing element may include a substantially porous surface.

In accordance with a further feature of the present invention, the at least one base may include at least one recess. The at least one processing element may include at least one projection, and the process may further include inserting the at least one projection into the at least one recess prior to the elastic bonding. After inserting the at least one projection into the at least one recess, a gap remains in the recess. The remaining gap may have a thickness that corresponds to a thickness of the elastic bonding material. The elastic bonding material may be inserted into the remaining gap prior to elastic bonding.

In accordance with a further feature of the present invention, the process may further include applying the elastic bonding material to a continuous surface of the at least one base, positioning the at least one processing element on the elastic bonding material, and holding the at least one processing element with a holding device during the elastic bonding.

In accordance with another feature of the present invention, the process may further include forming the elastic bonding material as a strip of material with projections extending substantially perpendicular on at least one side, placing the projections into corresponding openings in one of the at least one processing element and the base, and bonding the projections to the contact surfaces of the openings via vulcanization. The projections may extend substantially perpendicular to both sides of the strip material. The projections extending substantially perpendicular to the strip material may have thickened portions that, while placing the projections into the one of the at least one processing element and the base, may be elastically compressed and, after joining, may expand into the openings to fix the parts in the elastic bonding.

In accordance with still another feature of the present invention, before vulcanization, the process may include inserting knobs composed of a polymer through holes that penetrate one of the processing element and the base, and connecting the knobs to the layer by vulcanization.

In accordance with a still further feature of the present invention, the base may be composed of a steel alloy having a strength of at least about 300 $N/mm^2$.

In accordance with a still further feature of the present invention, the base may be shaped as a torus.

In accordance with another feature of the present invention, the base may be substantially shaped as a segment of a torus.

In accordance with another feature of the present invention, the base may be shaped as a truncated cone.

In accordance with a further feature of the present invention, the process may further include coupling the base and processing elements with a screw connection.

In accordance with still another feature of the present invention, the process may further include coupling the base and processing elements with a groove and projection connection.

The present invention may also be directed to a fitting for processing suspended fibrous material. The fitting includes a base adapted for attachment to a processing machine, at least one processing element adapted to be exposed to a stream of a fibrous material suspension during operation of the fitting, and an elastic layer located between the base and at least one processing element to couple the at least one processing element to the base.

In accordance with another feature of the present invention, the at least one processing element may be adapted for movement relative to another processing element to process the suspended fibrous material.

In accordance with still another feature of the present invention, the elastic layer may be composed of a vulcanized polymer.

In accordance with a further feature of the present invention, the elastic layer may have a thickness of least approximately 0.5 mm.

In accordance with a still further feature of the present invention, the elastic layer may have a thickness of least approximately 1.0 mm.

In accordance with yet another feature of the present invention, the at least one processing element and the base may be made of different materials.

The present invention may also be directed to a machine for mechanical processing of suspended fibrous material. The machine includes at least two fittings mounted for relative movement to each other. At least one of the at least two fittings may include at least one base that is at least one of rotatably and non-rotatably mounted, at least one processing element adapted to be exposed to the suspended fibrous material, and an elastic layer located between the base and at least one processing element to couple the at least one processing element to the base.

The present invention may also be directed to a process for producing a processing machine for mechanically processing suspended fibrous material in a machine including at least two fittings, at least one of the at least two fittings including at least one base, at least one processing element. The process includes forming at least one of the at least two fittings by separately producing the at least one base and the at least one processing element, placing an elastic bonding material between contact surfaces of the at least one base and the at least one processing element, and elastically bonding the at least one base and the at least one processing element without melting the processing elements mounted for relative movement to each other. The process may also include mounting the at least two fittings for movement relative to each other.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein:

FIG. 1 illustrates a sectional side view of a beating fixture produced in accordance with the present invention;

FIG. 2 illustrates a top view of a beating fixture;

FIGS. 3, 4, and 5 illustrate a perspective view of additional fittings produced in accordance with the present invention;

FIG. 6 illustrates a fitting with a truncated cone-shaped base;

FIG. 7 illustrates another variation of the fitting;

FIG. 8 illustrates a fitting for use in a disperser or deflaker; and

FIGS. 9, 10, 11, and 12 illustrate an alternative embodiments of a beater fitting.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The process of the present invention will be discussed with reference to the exemplary illustrations of the fittings produced. FIG. 1 illustrates a sectional side view of a base 1 having a processing element 2 mounted thereon. Processing element may include ridges 4, which may be of different lengths, that extend axially outwardly to a processing surface 5. In the exemplary illustration, a shorter ridge 4 is sectionally depicted. Ridges 4 of processing element 2 may protrude a distance c to create a beating or "knife" fitting. A layer 3, which may be a vulcanized layer and which may be made of a polymer suitable for vulcanization, may be positioned on connecting surfaces between processing element 2 and base 1. Layer 3 may be formed of a hard rubber, e.g., neoprene rubber, having a hardness between approximately 40–50 Shore degrees. Layer 3 may be flat and may have a large area, which makes this layer optimal for vulcanization. In an alternative embodiment, layer 3 may be composed of a non-vulcanized layer, e.g., a silicone mass or elastic plastic, such as polyurethane. Base 1 and processing elements 2 may be coupled together via the non-vulcanized layer in a manner similar to that utilized in, e.g., the production of car disc brakes. Base 1 may be coupled to a rotor 8 of, e.g., a beater device. The coupling may be made by, e.g., releasably connecting elements (not shown). Rotor 8 may be rotatably driven by shaft 9. Of course, the fittings produced according to the process of the present invention are likewise suitable for attachment to a stator. The hardness of the elastic connection should be sufficient to withstand pressure loads of approximately 2.5 $N/mm^2$ and shear loads of approximately 0.5 $N/mm^2$.

FIG. 2 illustrates a schematic top view of a fitting similar in general to the fitting depicted in FIG. 1. A torus-shaped base 1 may be coupled to processing elements 2. Processing elements 2 may include, e.g., ridges 4 having a width b, which may be, e.g., between approximately 1 and 200 mm, and preferably between approximately 1 to 20 mm. Ridges 4 may be straight and have different lengths, as shown in this exemplary embodiment. It is also noted that, in accordance with the features of the present invention, it is conceivable that ridges 4 may be not straight and/or curved. Layer 3 may also be arranged to cover base 1, even in areas in which no processing elements are located. In this manner, protection against corrosion and wear may be provided.

The process according to the present invention is likewise applicable even when the processing elements are not provided with ridges. That is, as shown in FIG. 3, processing elements 2' may include abrasive porous surfaces 5'.

As illustrated in FIG. 4, recesses 6 may be provided in base 1 and complementary projections 7 may be provided on processing element 2' to create a centering flange on one side. Further, recess 6 may be greater than complementary projection 7 so that when joined together, a space for expansion or for compensation of tolerances is provided. Thus, it is possible to precisely position processing element 2' prior to performing an attachment process, and the strength of the connection is increased. However, due to the additional expense in forming the recess 6 and projection 7, this feature may be omitted, as illustrated in FIG. 3. Again, layer 3 is shown coupled to the contact surfaces of the parts joined. While not illustrated, it is within the purview of the present invention that the free space between the recess 6 and projection 7 may be filled with an elastic material.

FIG. 5 illustrates a perspective view of a fitting provided with ridges. However, in contrast to the earlier described embodiments, the ridges may be individually coupled directly to the flat surface of base 1. Thus, each ridge is provided as an individual processing element 2. Thus, it may be advantageous to utilize an appropriate assembly device for the precise positioning of the processing elements 2 on base 1, e.g., a mounting arrangement that holds processing elements 2, 2', and 2" relative to each other in their intended finished positions. The assembly device may move the processing elements toward base 1 and hold them in place until the elastic connection is sufficient to prevent the processing elements from slipping.

FIG. 6 illustrates a schematic view of a portion of a conical refiner having a rotor 8'. A truncated cone-shaped base 1' may be coupled to rotor 8'. Base 1' may, in turn, be coupled to a plurality of processing elements 2, of which one is partially visible, in accordance with the features of the present invention. Processing elements 2 may be coupled to base 1' by layer 3. Moreover, the truncated cone-shaped stator of this machine may also be provided with fittings in accordance with the features of the present invention, however, this is not necessary.

FIG. 7 illustrates an alternative embodiment of the fittings produced by the process according to the present invention. In this case, a segment of a torus forms base 1, and the segment of the torus may be coupled to rotor 8. During assembly, a ring may be formed by a plurality of the segments, and these segments may be utilized on the rotor and/or on the stator. The illustrated segment may be provided with a plurality of groups of processing elements 2, which may be successively disposed one after the other in a radial direction. The division of the different processing elements for the fitting may be implemented based upon practical considerations, e.g., handling and production of the processing elements.

FIG. 8 illustrates a portion of a processing element 2" that may be utilized less for changing the pulp (i.e., beating) than for dispersion or deflaking the fibrous material. Processing element 2" may be in the form of a toothed ring that may be utilized in, e.g., dispersers or deflakers. These toothed rings may be often produced from special wear-resistant materials and may be attached as a whole or in segments to the base 1 by vulcanization. Again, while not shown in the exemplary illustration, the recesses and projections shown in FIG. 4 may be utilized to facilitate precise positioning and to further increase the strength of the finished fitting.

In accordance with the features of the present invention, it is also conceivable to use screw connections 10 between base 1 and processing element 2, as shown in FIGS. 9, 10, and 11, which depict various examples of a beating fitting. According to FIGS. 9 and 10, a screw 10 may be screwed into base 1. A throughhole 11 in processing element 2 may be provided that is wide enough to permit at least limited lateral compensation movement. However, most of the fitting height H is clearly fixed. In FIG. 10, layer 3 of the polymer may also be inserted into the throughhole and in the screw seating. In this manner, a greater expense results in improved strength of the fitting.

As an alternative to screw connection 10, it is also within the purview of the present invention to complete the connection via knobs 12 that are vulcanized in place, as illustrated in FIG. 11. Knobs 12 may be advantageously made of the same polymer as layer 3 lying between processing element 2 and the base 1, which is elastic and which increases the strength of the fitting in a simple manner. Knobs 12 may be, e.g., produced separately and may be inserted into the appropriate holes in processing element 2 and/or base 1 before vulcanization. Alternatively, knobs 12 may be, e.g., solidly bonded to the polymer sheet before vulcanization and elastically placed in the holes during assembly.

In other screw connections, e.g., as illustrated in FIG. 12, the screw thread may be embedded in processing element 2, provided that processing element 2 is made of a material suitable for this use. In this manner, the processing surface of the processing elements is not negatively affected by the screws.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for production of fittings for a mechanical processing of suspended fibrous material, the fittings including at least one base and at least one fibrous material processing element adapted to be exposed to the flow of a fibrous suspension during operation, the process comprising:

separately producing the at least one base and the at least one fibrous material processing element;

placing an elastic bonding material between contact surfaces of the at least one base and the at least one fibrous material processing element; and elastically bonding the at least one base and the at least one fibrous material processing element without melting the fibrous material processing elements.

2. The process according to claim 1, wherein after the elastic bonding, an elastic layer having a thickness of at least approximately 0.5 mm is formed between the at least one base and the at least one fibrous material processing element.

3. The process according to claim 1, wherein after the elastic bonding, the elastic layer formed between the at least one base and the at least one fibrous material processing element has a thickness of at least approximately 1.0 mm.

4. The process according to claim 1, the elastic bonding comprising vulcanizing the elastic bonding material, wherein elastic bonding material is composed of a polymer.

5. The process according to claim 4, the vulcanizing comprising setting a temperature at the contact surfaces between approximately 100° C. to 150° C.

6. The process according to claim 4, the vulcanizing comprising maintaining an absolute pressure of under at least approximately 3 bar.

7. The process according to claim 4, the vulcanizing comprising providing an air/steam atmosphere.

8. The process according to claim 4, wherein the polymer is composed of a synthetic rubber.

9. The process according to claim 4, the placing of the elastic bonding material comprising:

forming the polymer into a sheet;

attaching the polymer sheet to the at least one base; and placing the at least one processing element on the polymer sheet.

10. The process according to claim 1, wherein the elastic bonding material forms an elastic layer after the elastic bonding, and the process further comprises:

gluing the elastic layer to the at least one base and to the at least one fibrous material processing element.

11. The process according to claim 10, wherein the elastic bonding material is composed primarily of silicone.

12. The process according to claim 10, wherein the elastic bonding material is composed of a plastic sheet that is coated on both sides with an adhesive.

13. The process according to claim 1, wherein the at least one fibrous material processing element is composed at least partially of ceramic.

14. The process according to claim 1, wherein the at least one fibrous material processing element is composed of a ceramic composite material.

15. The process according to claim 1, wherein the at least one fibrous material processing element includes ridges located on a side adapted to be positioned toward the fibrous suspension.

16. The process according to claim 15, wherein the ridges extend above a base of a groove by between approximately 2 and 20 mm.

17. The process according to claim 1, wherein the at least one fibrous material processing element includes a substantially porous surface.

18. The process according to claim 1, wherein the at least one base includes at least one recess, wherein the at least one fibrous material processing element includes at least one projection, and the process further includes:

inserting the at least one projection into the at least one recess prior to the elastic bonding.

19. The process according to claim 18, wherein, after inserting the at least one projection into the at least one recess, a gap remains in the recess.

20. The process according to claim 19, wherein the remaining gap has a thickness that corresponds with a thickness of the elastic bonding material.

21. The process according to claim 20, wherein the elastic bonding material is inserted into the remaining gap prior to elastic bonding.

22. The process according to claim 1, further comprising:

applying the elastic bonding material to a continuous surface of the at least one base;

positioning the at least one fibrous material processing element on the elastic bonding material; and holding the at least one fibrous material processing element with a holding device during the elastic bonding.

23. The process according to claim 1, the process further comprising:

forming the elastic bonding material as a strip of material with projections extending substantially perpendicular on at least one side;

placing the projections into corresponding openings in one of the at least one processing element and the base; and bonding the projections to the contact surfaces of the openings via vulcanization.

24. The process according to claim 23, wherein the projections extend substantially perpendicular to both sides of the strip material.

25. The process according to claim 23, wherein the projections extending perpendicular to the strip material have thickened portions that, while placing the projections into the one of the processing element and the base, are elastically compressed and, after joining, expand into the openings to fix the parts in the elastic bonding.

26. The process according to claim 1, before vulcanization, the process comprising:

inserting knobs composed of a polymer through holes that penetrate one of the processing element and the base; and connecting the knobs to the layer by vulcanization.

27. The process according to claim 1, wherein the base is composed of a steel alloy having a strength of at least about 300 $N/mm^2$.

28. The process according to claim 1, wherein the base is shaped as a torus.

29. The process according to claim 1, wherein the base is substantially shaped as a segment of a torus.

30. The process according to claim 1, wherein the base is shaped as a truncated cone.

31. The process according to claim 1, further comprising:

coupling the base and processing elements with a screw connection.

32. The process according to claim 1, further comprising:

coupling the base and processing elements with a groove and projection connection.

* * * * *